United States Patent
Maxwell et al.

(10) Patent No.: US 8,976,174 B2
(45) Date of Patent: *Mar. 10, 2015

(54) BI-ILLUMINANT DICHROMATIC REFLECTION MODEL FOR IMAGE MANIPULATION

(75) Inventors: Bruce Allen Maxwell, Springfield, PA (US); Richard Mark Friedhoff, New York, NY (US); Casey Arthur Smith, Ithaca, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 11/403,764

(22) Filed: Apr. 13, 2006

(65) Prior Publication Data
US 2007/0176941 A1 Aug. 2, 2007

Related U.S. Application Data

(63) Continuation-in-part of application No. 11/341,751, filed on Jan. 27, 2006.

(51) Int. Cl.
| | |
|---|---|
| *G06T 15/50* | (2011.01) |
| *G06T 15/60* | (2006.01) |
| *G06T 7/40* | (2006.01) |
| *G06T 5/00* | (2006.01) |
| *H04N 1/62* | (2006.01) |

(52) U.S. Cl.
CPC ............ *G06T 7/408* (2013.01); *G06T 5/008* (2013.01); *G06T 15/506* (2013.01); *H04N 1/62* (2013.01); *G06T 2207/10024* (2013.01); *G06T 2207/20012* (2013.01); *G06T 2207/20104* (2013.01); *G06T 2207/20192* (2013.01)
USPC ........................................................ 345/426

(58) Field of Classification Search
CPC ............................................ G06T 15/50–15/87
USPC .......................................................... 345/589
See application file for complete search history.

(56) References Cited

U.S. PATENT DOCUMENTS

| | | | | |
|---|---|---|---|---|
| 5,253,339 A | * | 10/1993 | Wells et al. ................... | 345/426 |
| 5,495,536 A | | 2/1996 | Osbourn ...................... | 382/199 |
| 5,651,042 A | | 7/1997 | Dewaele ........................ | 378/62 |

(Continued)

OTHER PUBLICATIONS

Baba, et al. "Shadow removal from a real image based on shadow density" ACM SIGGRAPH 2004 Posters, Aug. 8-12, 2004, Los Angeles, California.*

(Continued)

*Primary Examiner* — Aaron M Richer
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method for manipulating an image comprises the steps of manipulating the image to provide an intensity adjusted image, deriving a bi-illuminant dichromatic reflection model representation of the image and utilizing the bi-illuminant dichromatic reflection model representation to manipulate the intensity adjusted image to generate a color correct intensity adjusted image. In a preferred embodiment of the present invention, the step of manipulating the image to provide an intensity adjusted image is carried out by executing a gamma correction method.

7 Claims, 14 Drawing Sheets

Method of estimating percent of direct illumination (g) from a dynamic range compressed image.

(56) References Cited

U.S. PATENT DOCUMENTS

| | | | |
|---|---|---|---|
| 5,774,112 A * | 6/1998 | Kasson | 345/601 |
| 6,061,091 A | 5/2000 | Van de Poel et al. | 348/241 |
| 6,272,249 B1 | 8/2001 | Kobayashi et al. | 382/224 |
| 6,428,169 B1 | 8/2002 | Deter et al. | 353/20 |
| 6,792,160 B2 * | 9/2004 | Shaw et al. | 382/272 |
| 7,031,525 B2 | 4/2006 | Beardsley | 382/199 |
| 7,305,127 B2 * | 12/2007 | Wells | 382/168 |
| 2001/0007599 A1 * | 7/2001 | Iguchi et al. | 382/274 |
| 2002/0080148 A1 | 6/2002 | Uchino | 345/629 |
| 2002/0176023 A1 | 11/2002 | Hofflinger et al. | 348/645 |
| 2003/0053689 A1 * | 3/2003 | Watanabe et al. | 382/167 |
| 2005/0117045 A1 | 6/2005 | Abdellatif et al. | 348/335 |
| 2006/0018537 A1 | 1/2006 | Wu et al. | 382/168 |
| 2006/0018539 A1 | 1/2006 | Sato et al. | 382/173 |

OTHER PUBLICATIONS

Ebner, Marc and Christian Herrmann. "On Determining the Color of the Illuminant Using the Dichromatic Reflection Model". Sep. 14, 2005. p. 1-8. Available at http://www.springerlink.com/content/6r7teb3tmfpg8wce/fulltext.pdf.*

Kobus Barnard and Graham Finlayson, Shadow Identification using Colour Ratios, Proceedings of the IS&T/SID Eighth Color Imaging Conference: Color Science, Systems and Applications, 2000, 97-101.

Baba, et al:"Shadow removal from a real picture," Proceedings of the SIGGRAPH 2003 conference on Sketches & Applications, ACM Press, 1-1, 2003, 1 page.

Sato et al: Illumination distribution from brightness in shadows: adaptive distribution with unknown reflectance properties in shadow regions, IN ICCV(2) 875-882, 1999.

K. Barnard, G.D. Finlayson and B. Funt, *Color Constancy for Scenes with Varying Illumination*, Computer Vision and Image Understanding, 65(2): 311-321, Feb. 1997.

H.G. Barrow and J.M. Tenenbaum, *Recovering Intrinsic Scene Characteristics from Imag*, Computer Vision Systems, pp. 3-26, 1978.

C.F. Borges, *A Trichromatic Approximation Method for Surface Illumination*, Journal of Optical Society of America A, 8(8): 1319-1323., Aug. 1991.

M.S. Drew, G.D. Finlayson and S.D. Horley, *Recovery of Chromaticity Image Free from Shadows via Illumination Invariance*, Proceedings of IEEE Workshop on Color and Photometric Methods in Computer Vision, Nice, France 2003, pp. 32-39.

C.D. Finlayson, M.S. Drew and L. Cheng, *Intrinsic Images by Entropy Minimization*, Proceedings of European Conference on Computer Vision, LNCS 3023, pp. 582-595, 2004.

G.D. Finlayson, S.D. Horley and M.S. Drew, *Removing Shadows from Images*, 2002, pp. 2-14.

G.D. Finlayson, S.D. Horley and M.S. Drew, *On the Removal of Shadows from Images*, 2006, pp. 1-11.

G.D. Funklea and R. Bajcsy, *Combining Color and Geometry for the Active, Visual Recognition of Shadows*, University of Pennsylvania Department of Computer & Information Science Technical Report No. MS-CIS-94-62, 1994.

R. Gershon, A.D. Jepson and J. K. Tsotsos, *Ambient Illumination and the Determination of Material Changes*, Journal of Optical Society of America A, 3(10):1700-1707, 1986.

J.M. Geusebroek, R.v.d. Bommgard and A.W.M. Smeulders, *Color Invariance*, IEEE Trans. On Pattern Analysis and Machine Intelligence, 23(12):1338-1350, Dec. 2001.

G.E. Healey, *Using Color for Geometry-Insensitive Segmentation*, Journal of Optical Society of America A, 6(6):920-937, Jun. 1989.

B.K.P. Horn, *Determining Lightness from an Image*, Computer Graphics and Image Processing, 3(1)277-299, Dec. 1974.

G.J. Klinker, S.A. Shafer and T. Kanade, *A Physical Approach to Color Image Understanding*, International Journal of Computer Vision, 4(1): 7-38, Jan. 1990.

E.H. Land and J.J. McCann, *Lightness and Retinex Theory*, Journal of Optical Society of America A, 61:1-11, 1971.

M.S. Langer, *When Shadows Become Interreflections*, International Journal of Computer Vision, 34(2/3), 193-204, 1999.

J.A. Marchant and C.M. Onyango, *Shadow-Invariant Classification for Scenes Illuminated by Daylight*, Journal of Optical Society of America A, 17(11), Nov. 2000.

S.K. Nayar, K. Ikeuchi and T. Kanade, *Shape from Interreflections*, IEEE International Conference onn cOmputr Vision (ICCV), pp. 2-11, Dec. 1990.

I. Omer and M. Werman, *Color Lines: Image Specific Color Representation*, Proceeding of IEEE Conference on Computer Vision and Patter Recognition, pp. 946-953, Jun. 2004.

S.A Shafer, *Using Color to Separate Reflection Components*, Computer Science Department University of Rochester, TR 136, Apr. 1984.

S. Tominaga, *Surface Identification Using Dichromatic Reflection Model*, IEEE Transactions of Pattern Analysis and Machine Intelligence, 13(7), pp. 658-670, Jul. 1991.

S. Tominaga and N. Tanaka, *Estimating Reflection Parameters from a Single Color Image*, IEEE Comput. Graph. Appl., 20(5):58-66, 2000.

J.v.d. Weijer and C. Schmid, *Coloring Local Feature Extraction*, pp. 1-14, 2006.

Marc Ebner et al.: "On determining the color of the illuminant using dichromatic reflection model," Sep. 14, 2005. p. 1-8. Available at http://www.springerlink.com/content/6r7teb3unfpq8wce/fulltext.pdf.

Baba et al.: "Shadow Removal from a Real Picture by Color Correction Based on Degree of Shadow," proceeding of Visual Computing Graphics and CAD joint meeting 2003, Japan, The Institute of Imaging Electronics Engineers of Japan, Information Processing Society of Japan, Jun. 19, 2003, pp. 37 to 42; see enclosed translation (8 pages).

Baba et al:"Shadow Removal from a Real Image Based on Color Clustering," Journal of the Institute of Imaging Electronics Engineers of Japan, Japan, The Institute of Imaging Electronics Engineers of Japan, Aug. 25, 2004, vol. 33, No. 4-B, pp. 531-538; see English translation (8 pages).

Lifeng Liu et al: "Color change method based on dichromatic reflection model" Signal Processing, 1996., 3rd International Conference on Beijing, China Oct. 14-18, 1996, New York, NY, USA,IEEE, US LNKD-DOI:10.1109/ICSIGP.1996.566520, vol. 2, Oct. 14, 1996, pp. 1246-1249.

Magda S et al: "Beyond lambert: reconstructing surfaces with arbitrary BRDFs" Proceedings of the Eight IEEE International Conference on Computer Vision. (ICCV). Vancouver, British Columbia, Canada, Jul. 7-14, 2001; [International Conference on Computer Vision], Los Alamitos, CA : IEEE Comp. Soc, US LNKD- DOI:10.1109/ICCV.200, vol. 2, Jul. 7, 2001, pp. 391-398.

* cited by examiner

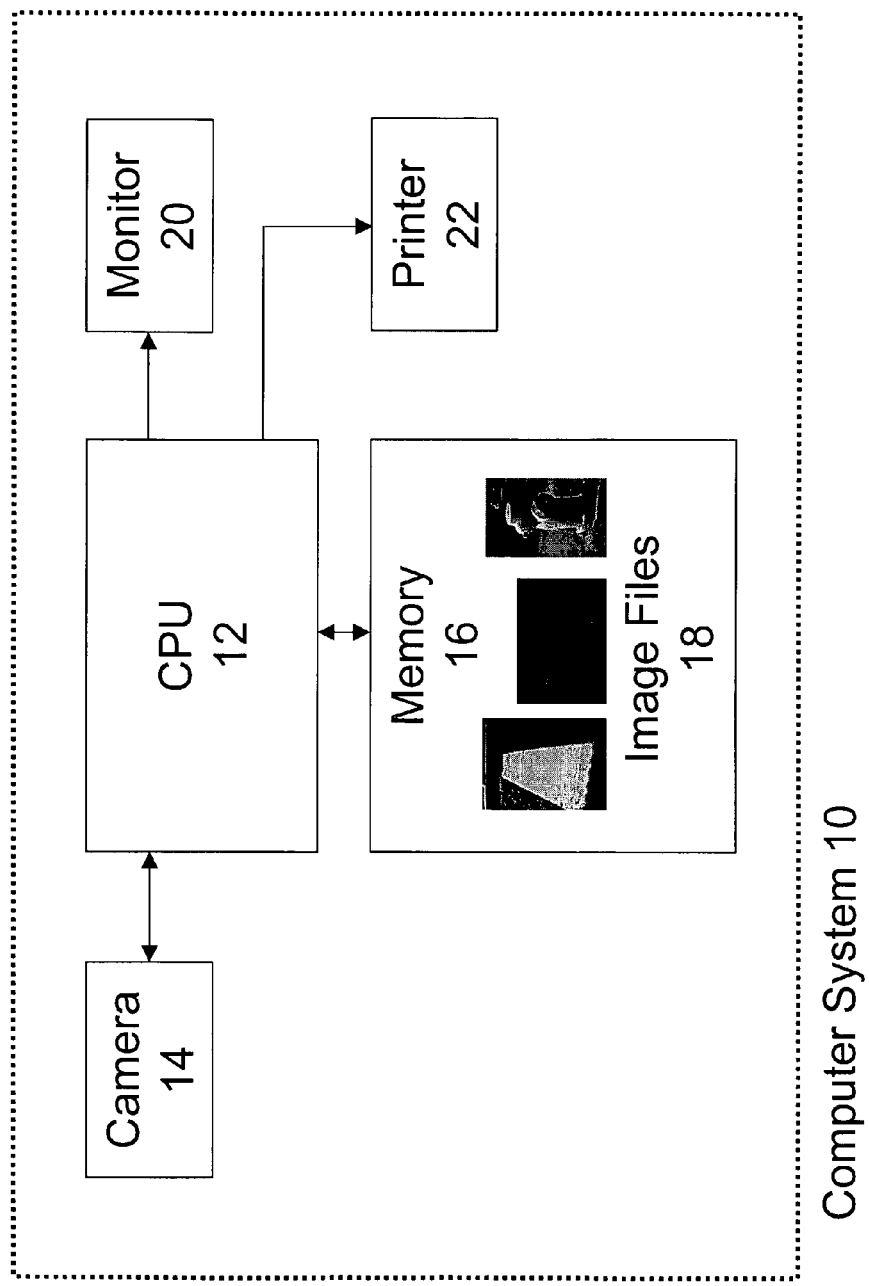
Figure 1: Computer System Configured to Operate on Images

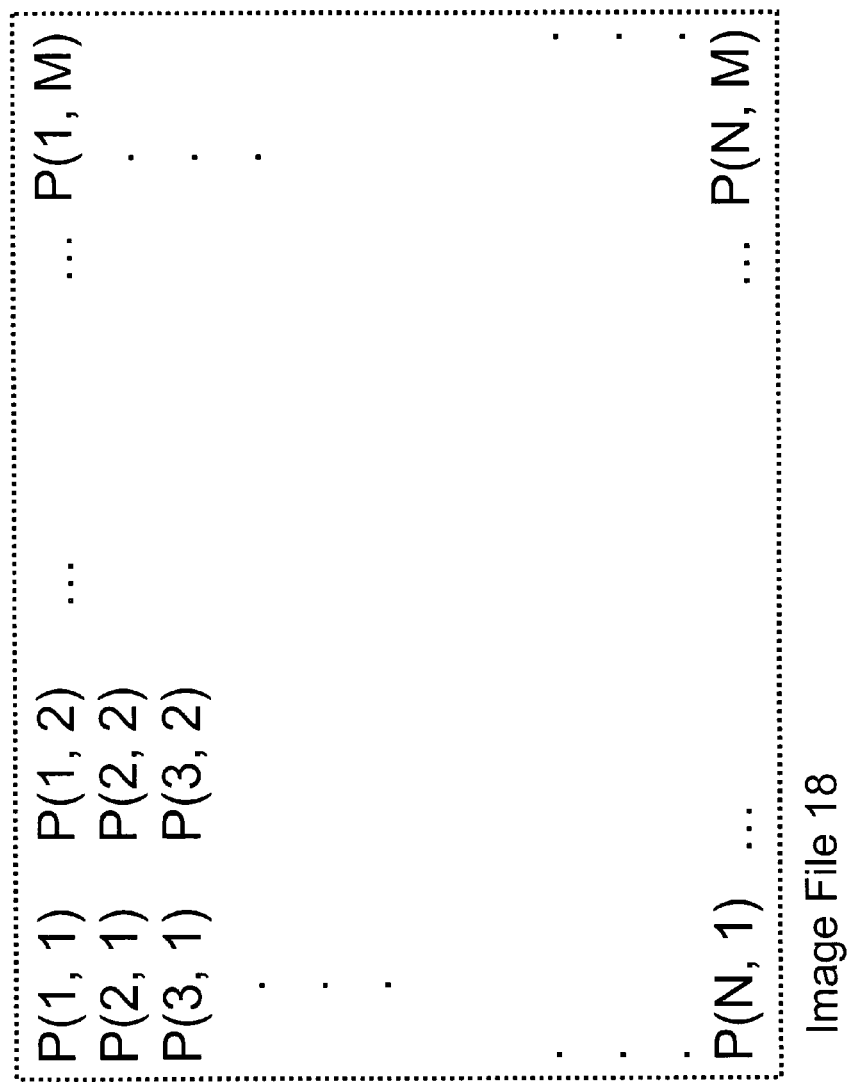
Figure 2: Pixel Array for Storing Image Data

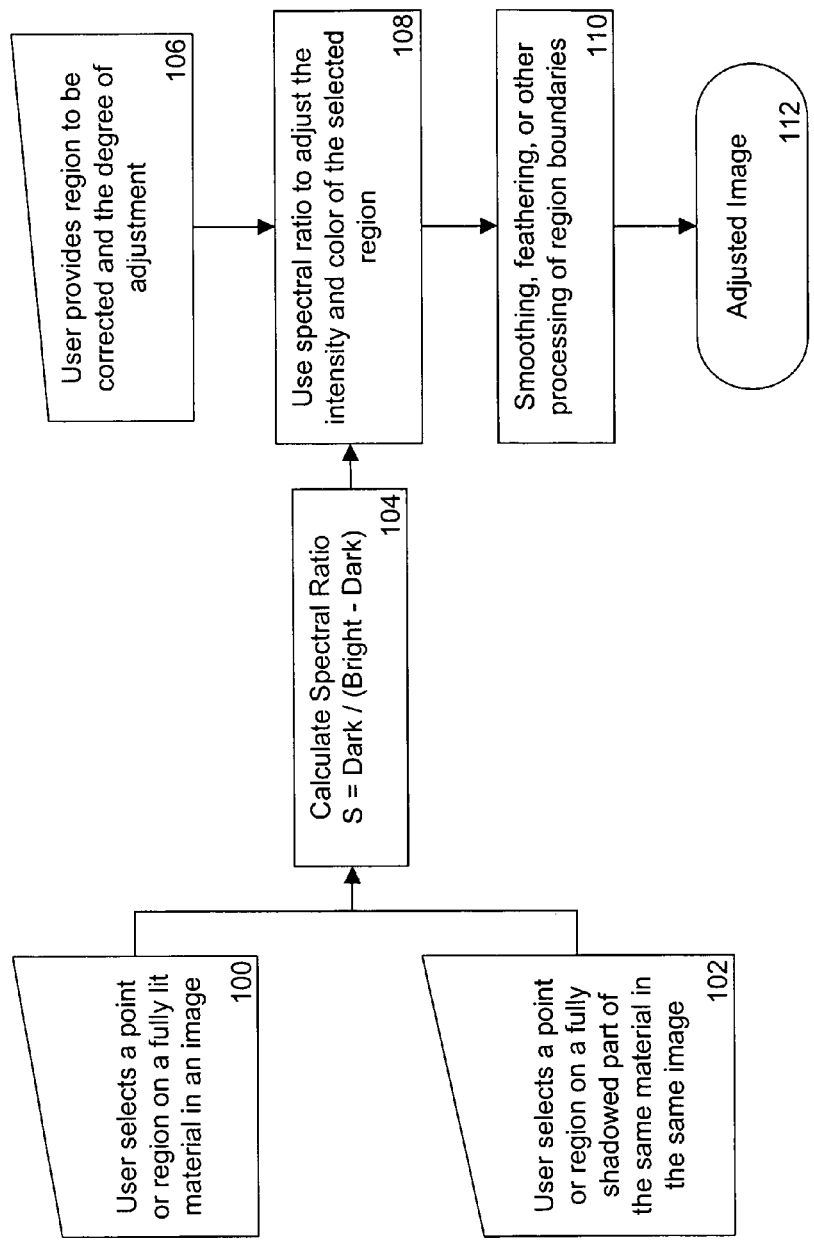
Figure 3: Modifying a Shadow with Manual Input

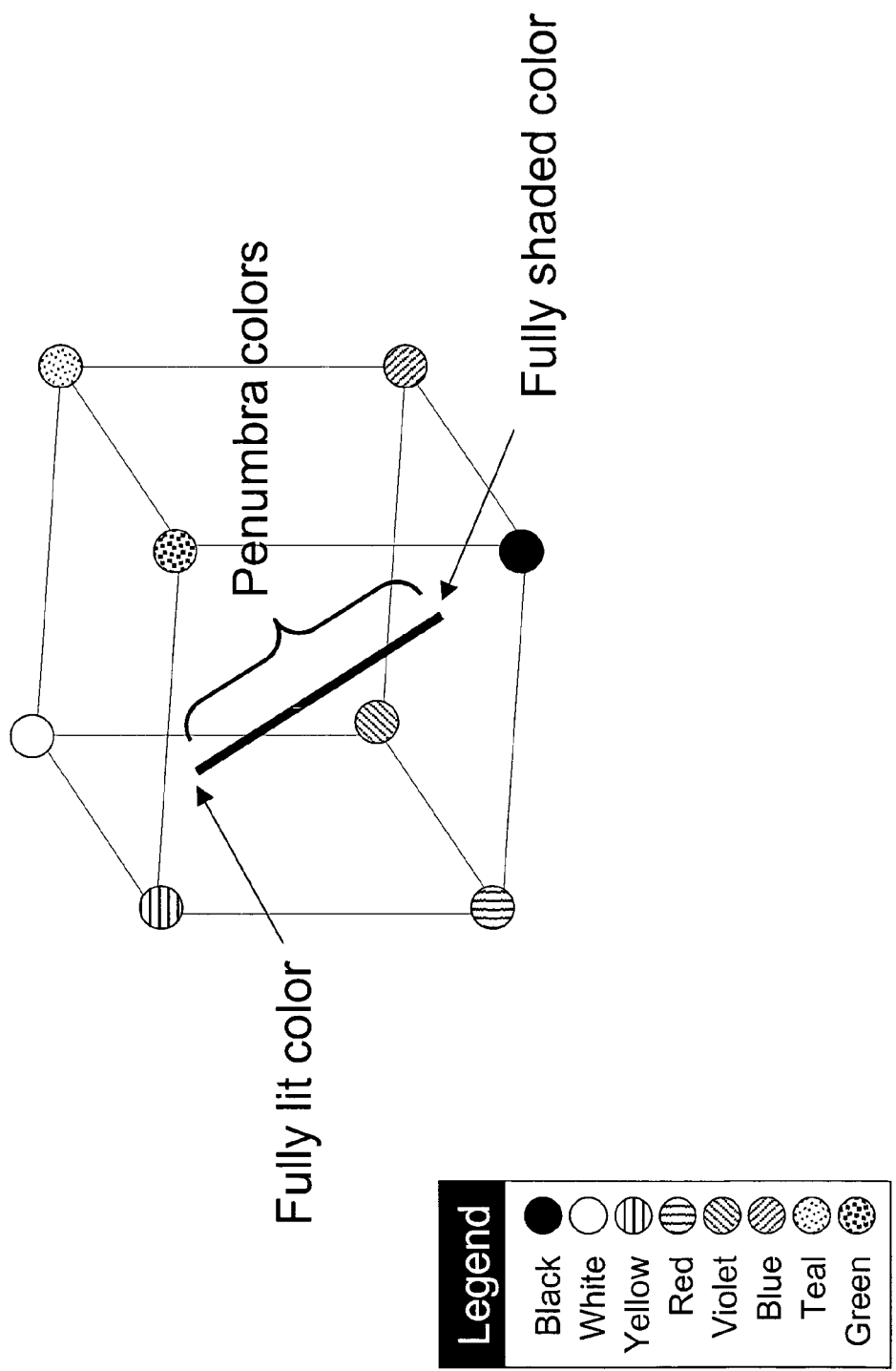
Figure 4: Representation of Body Reflection in RGB Space

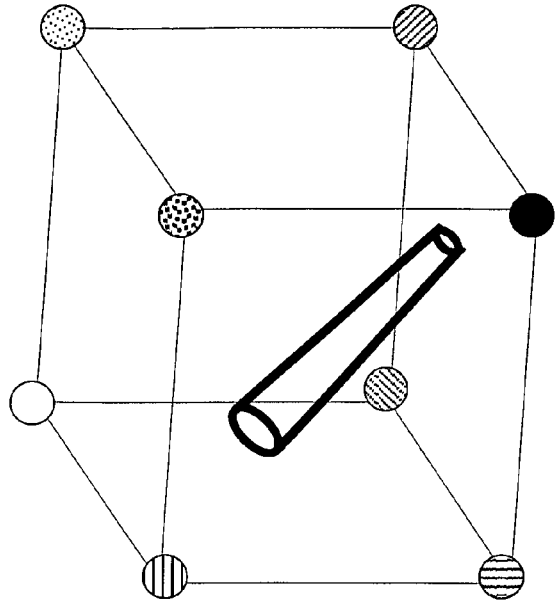
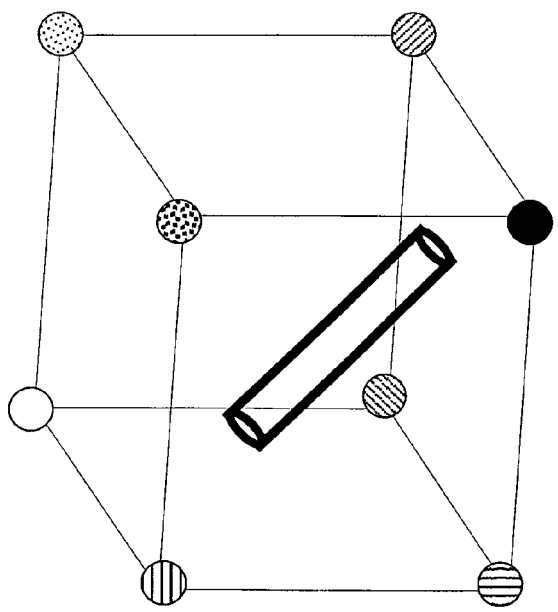
Figure 5A: Body reflection with uniform error bounds
Figure 5B: Body reflection with non-uniform error bounds that are tighter at the dark end.
Figure 5A, 5B: Representation of Body Reflection with Noise

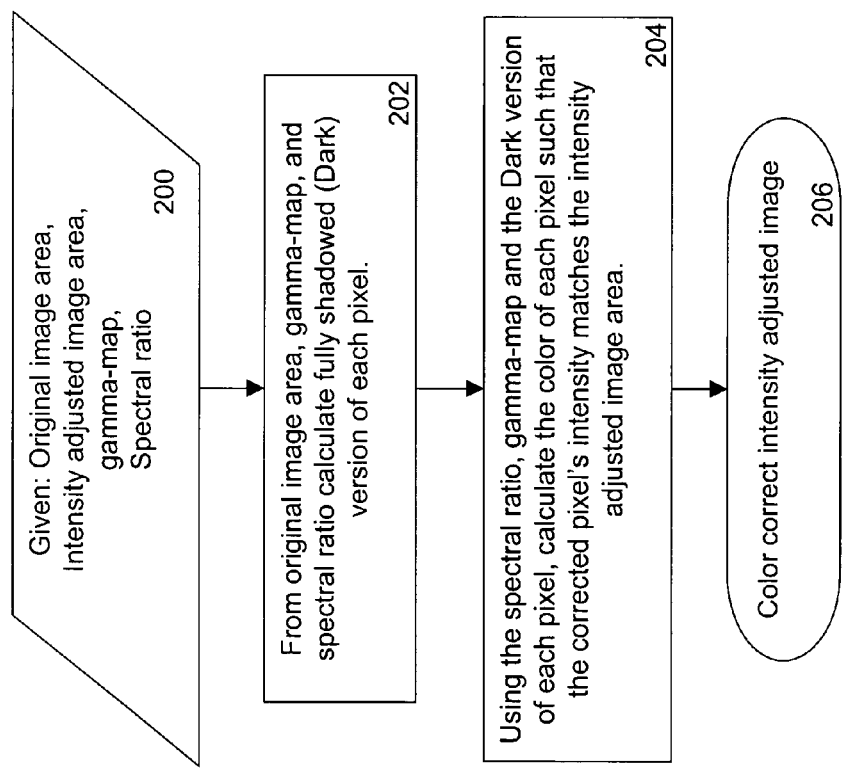
Figure 6A: Color Correct Brightness Adjustment

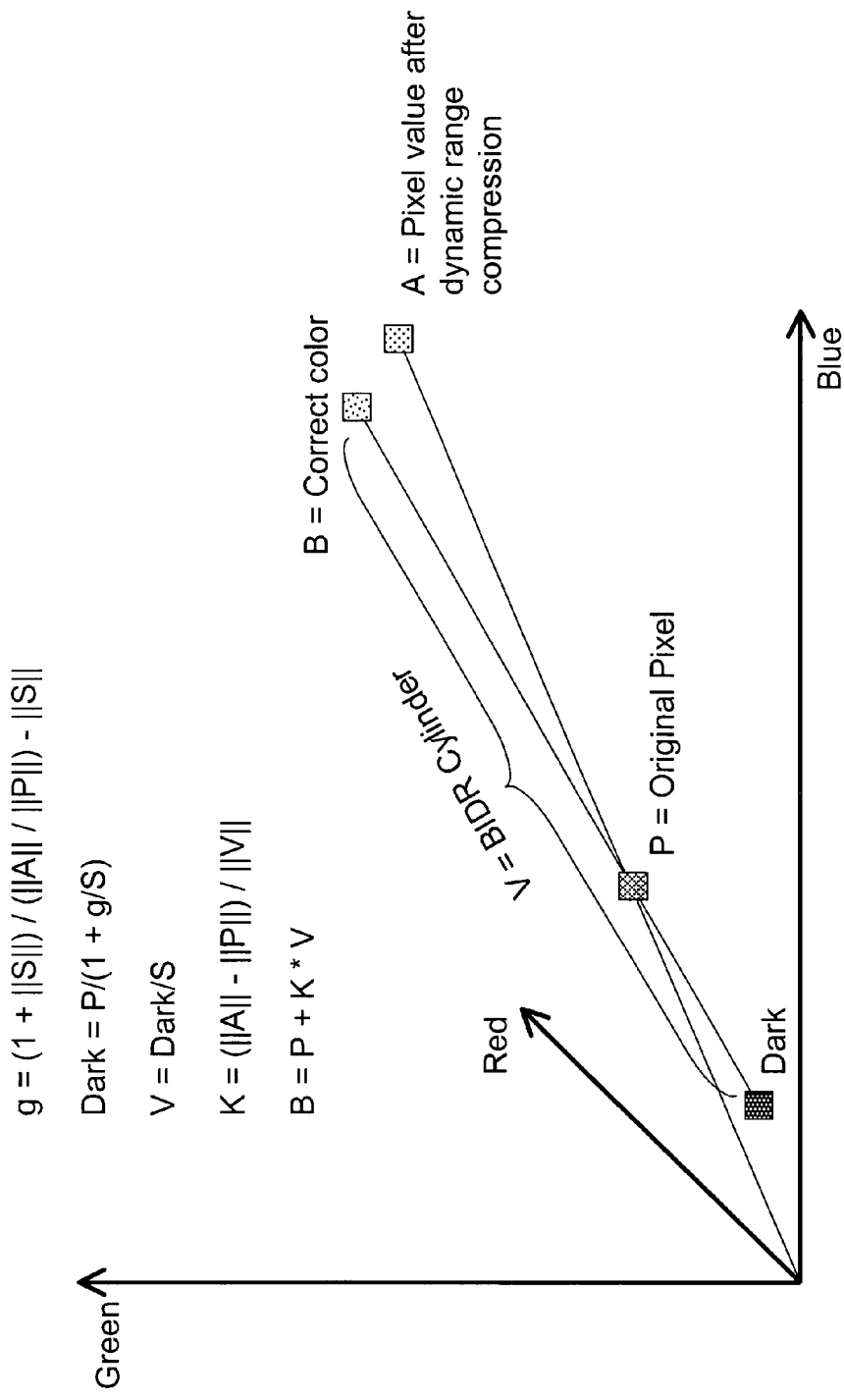
Figure 6B. Method of estimating percent of direct illumination (g) from a dynamic range compressed image.

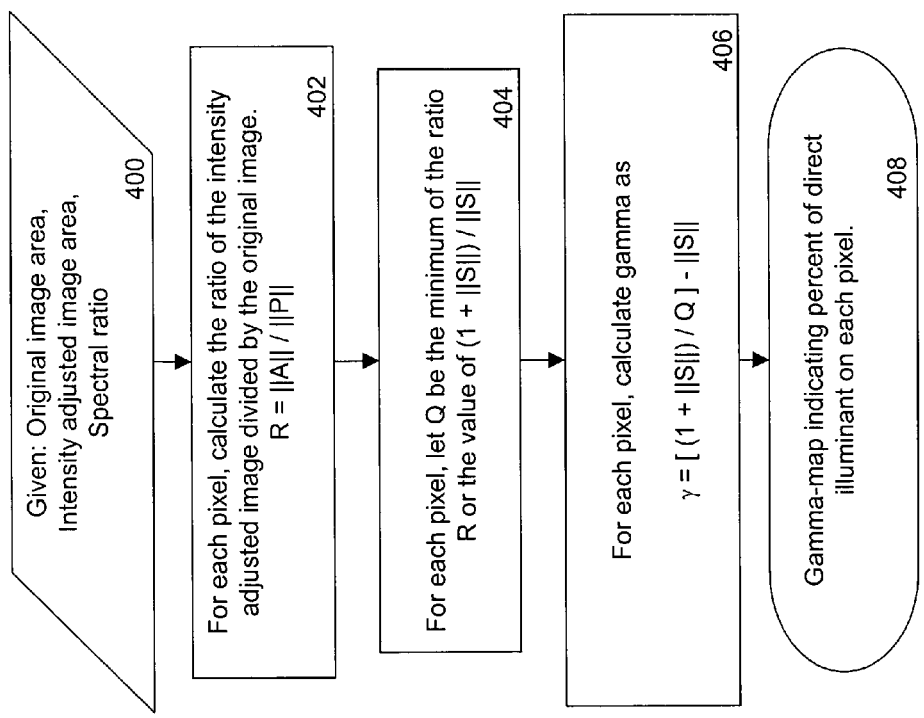
Figure 6C: Estimating Gamma Using a Dynamic Range Compression Algorithm

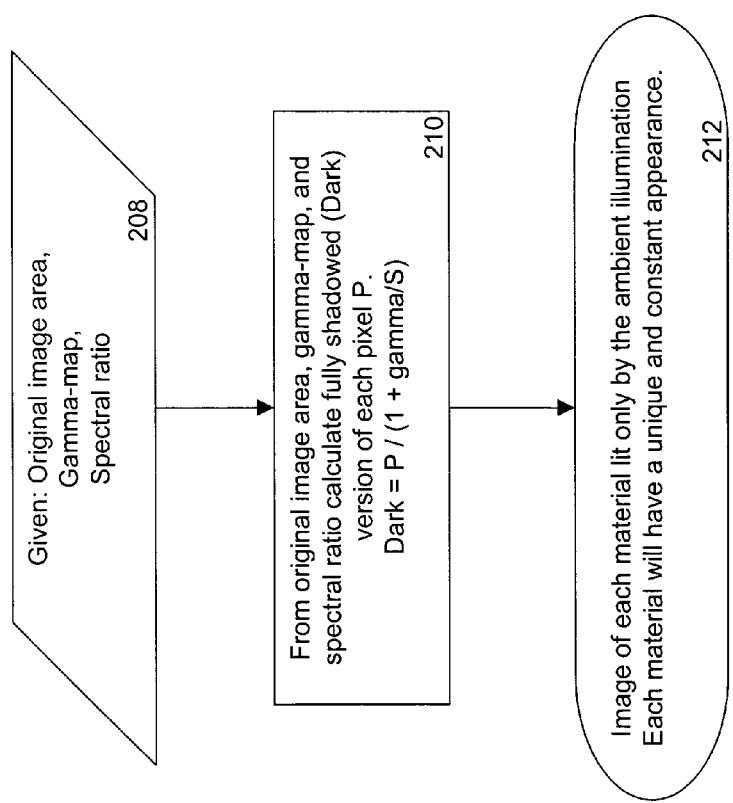
Figure 7: Removing Direct Illumination From an Image Area

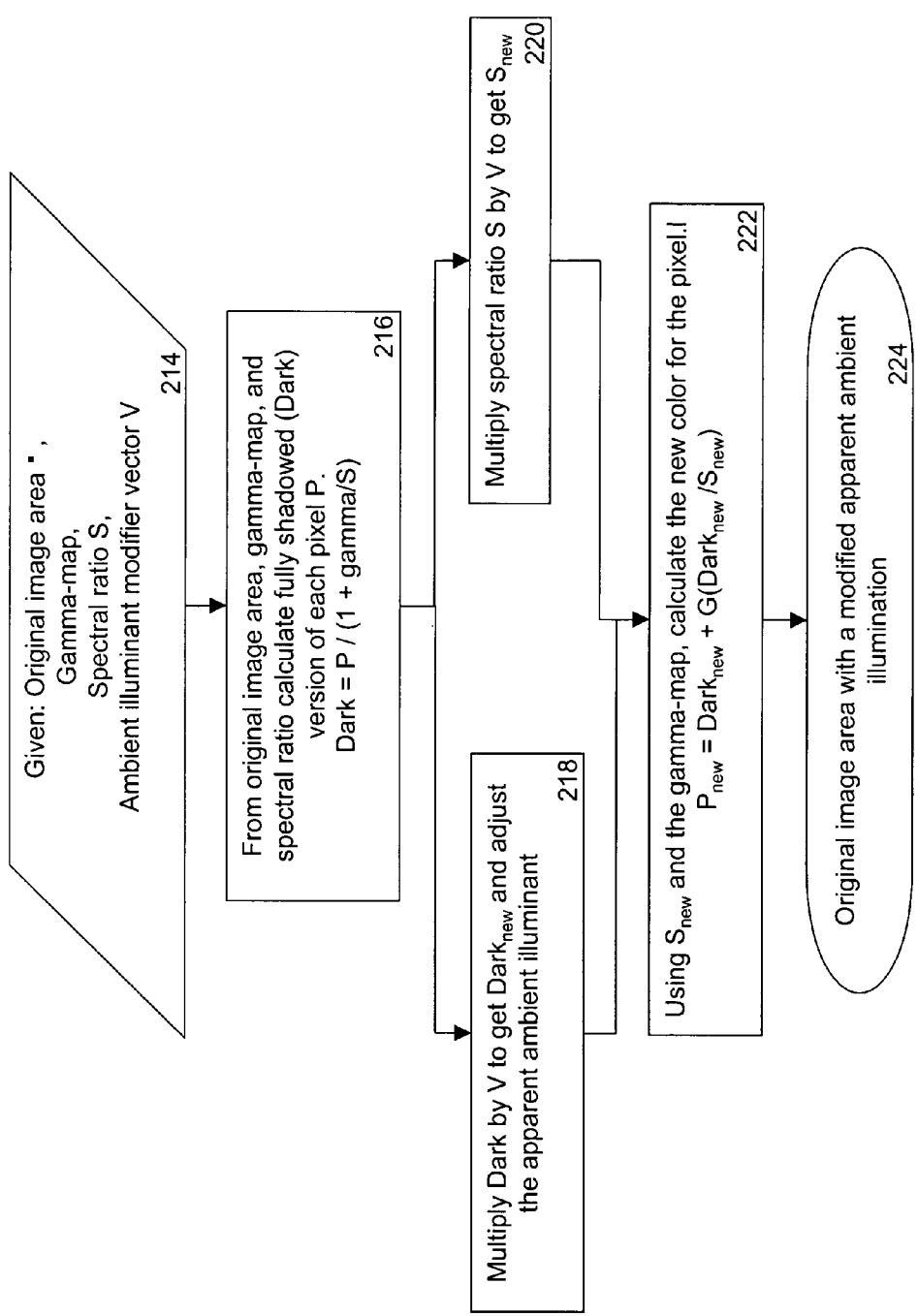
Figure 8: Modifying the Apparent Ambient Illumination of an Image Area

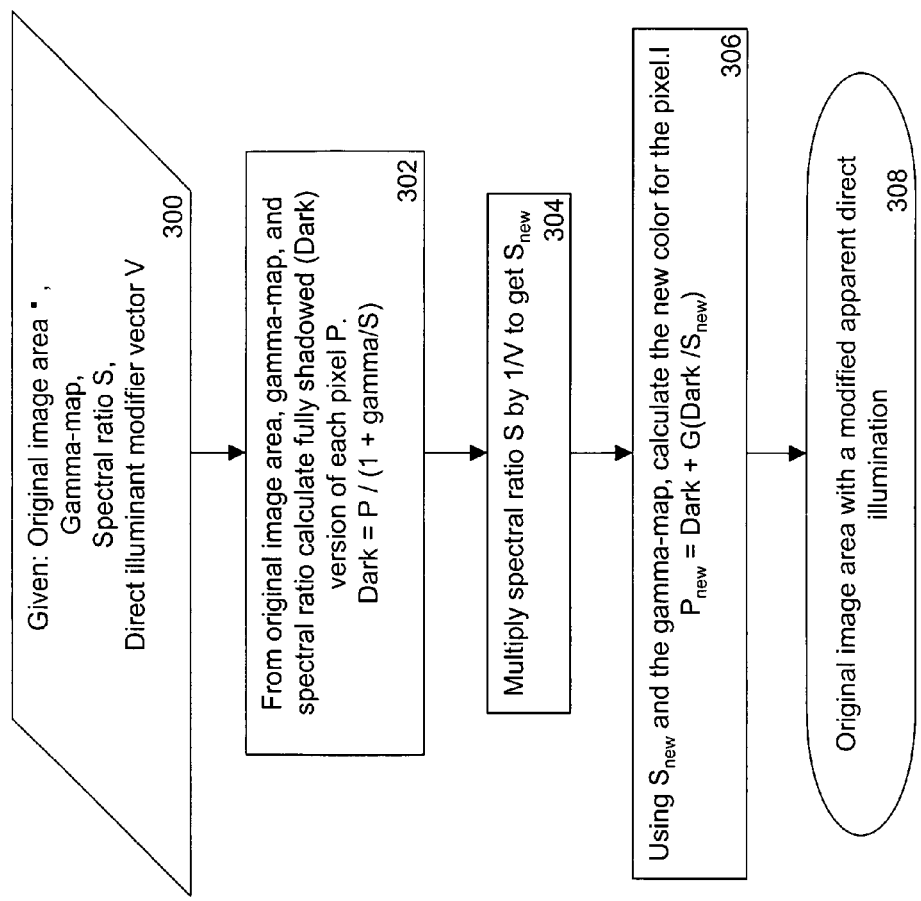
Figure 9: Modifying the Apparent Ambient Illumination of an Image Area

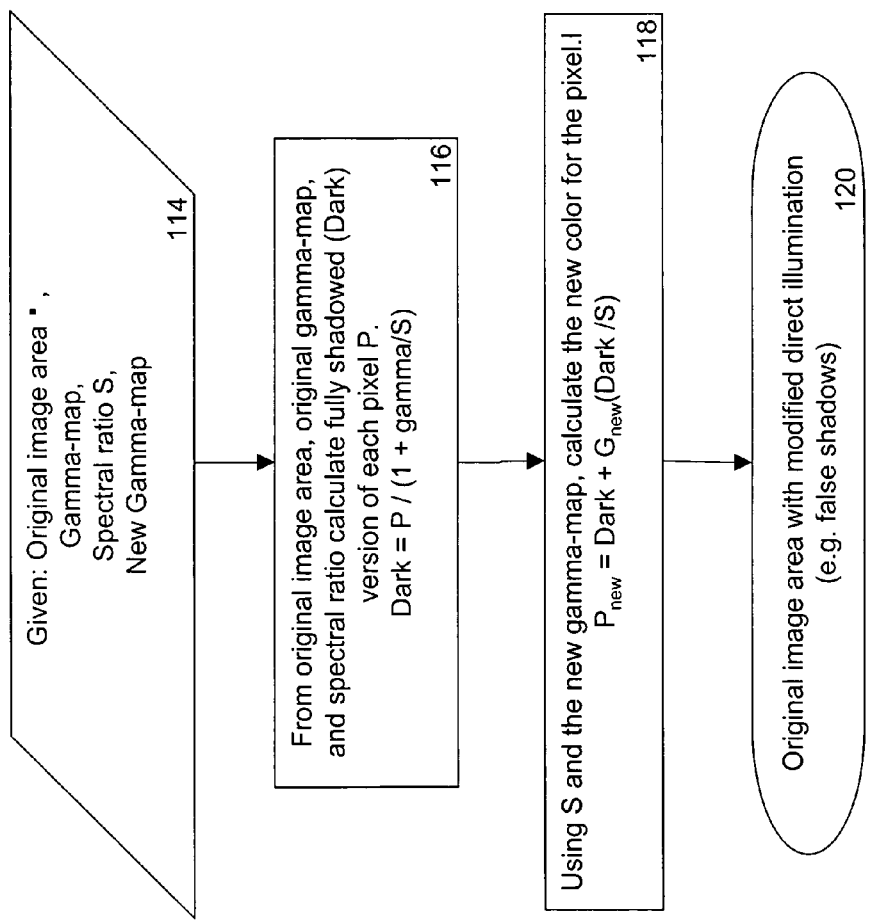
Figure 10: Modifying the Apparent Level of Direct Illumination of an Image Area

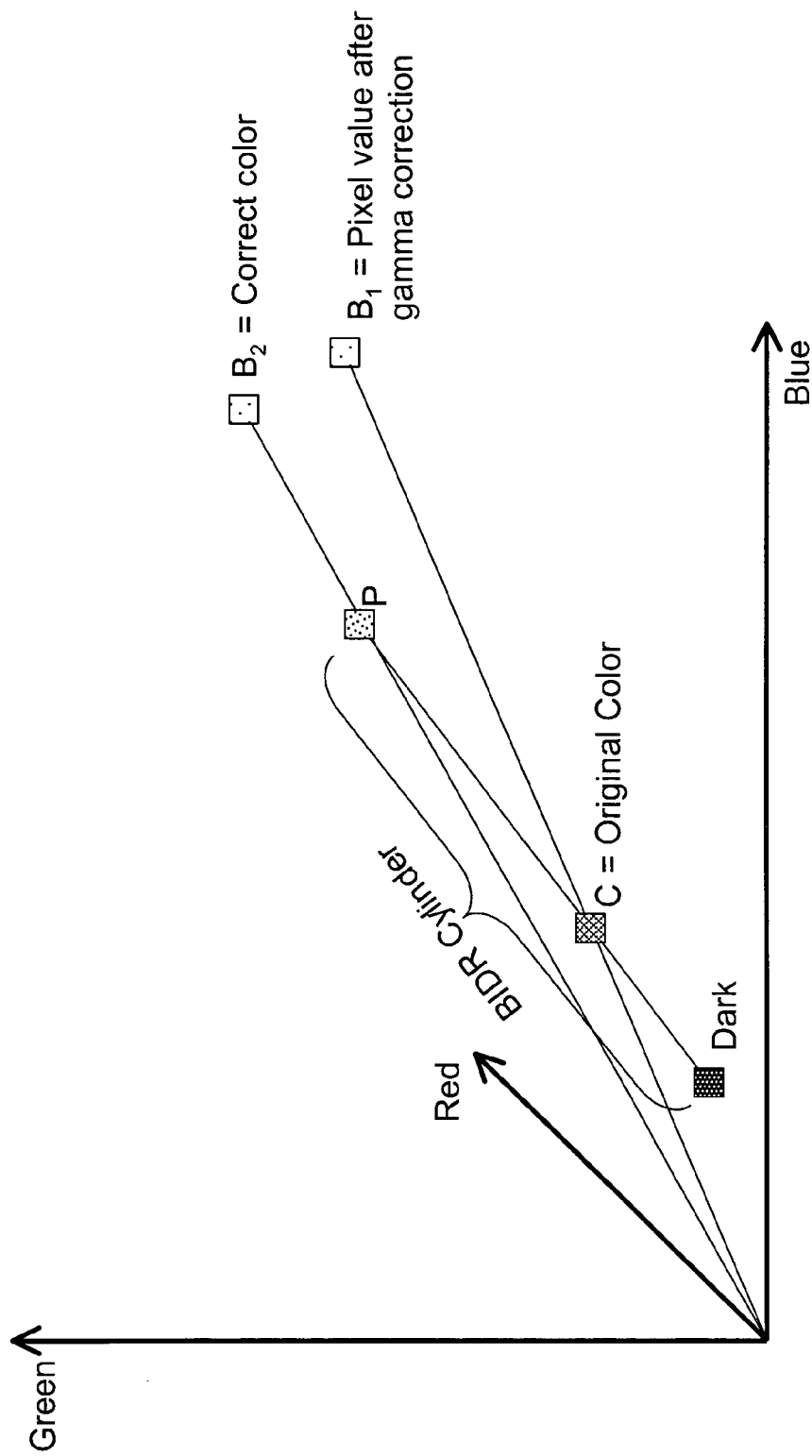
Figure 11. Diagram of color correct gamma correction.

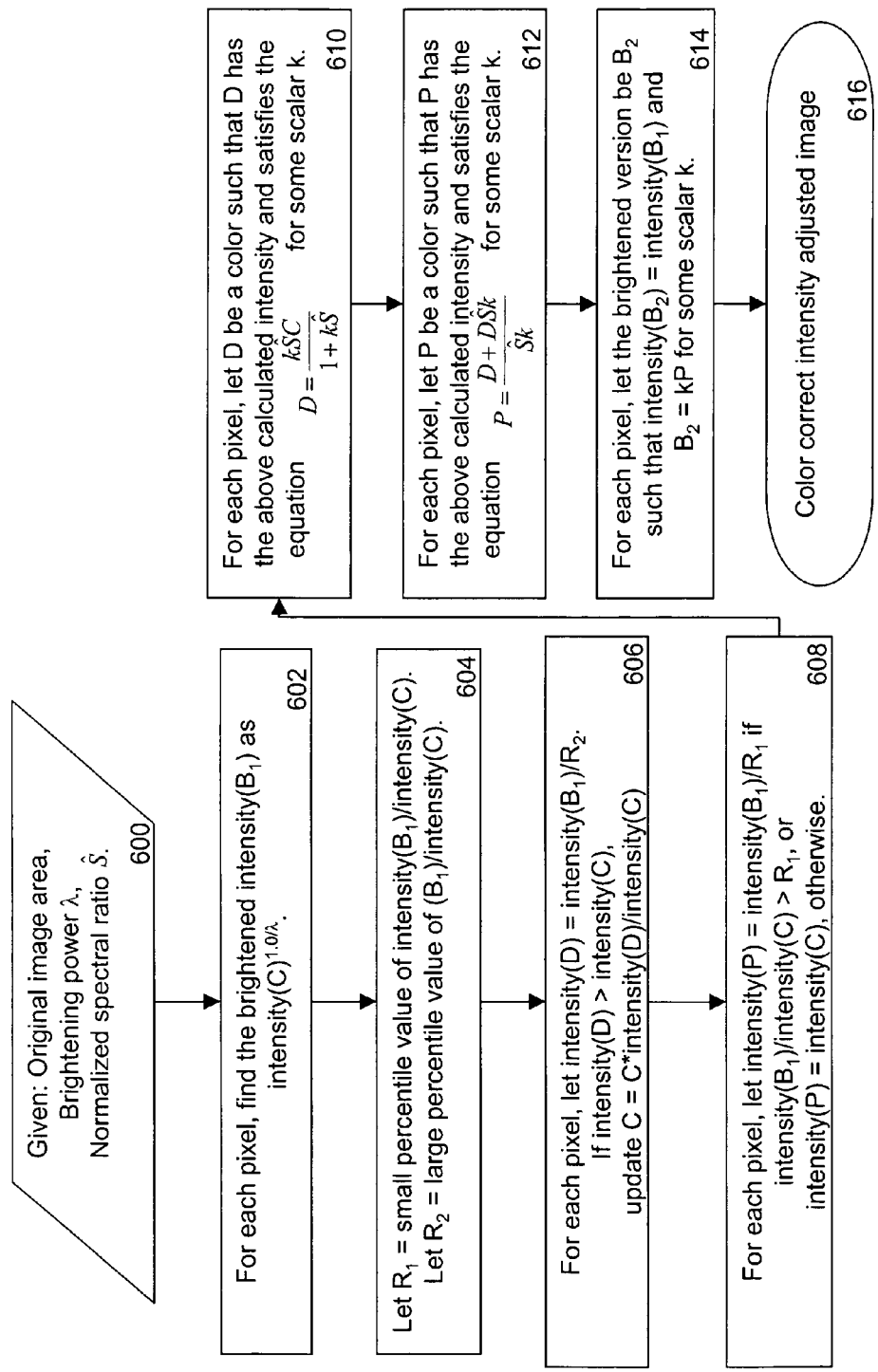
Figure 12: Color Correct Gamma Correction

BI-ILLUMINANT DICHROMATIC REFLECTION MODEL FOR IMAGE MANIPULATION

This application is a continuation-in-part of application Ser. No. 11/341,751, filed Jan. 27, 2006, entitled: "Bi-illuminant Dichromatic Reflection Model For Image Manipulation," which is hereby incorporated by reference.

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object edge within an image has been a persistent challenge to scientists. Edge detection is a fundamental task in image processing because without accurate and correct detection of the edges of physical objects, no other processing of the image is possible. If a cast shadow is indistinguishable from the object casting the shadow, it would not be possible for the computer to recognize the object.

An early and conventional approach to object edge detection involves an analysis of brightness boundaries in an image. In the analysis it is assumed that a boundary caused by a material object will be sharp, while a boundary caused by a shadow will be soft or gradual due to the penumbra effect of shadows. While this approach can be implemented by algorithms that can be accurately executed by a computer, the results will often be incorrect. In the real world there are many instances wherein shadows form sharp boundaries, and conversely, material object edges form soft boundaries. Thus, when utilizing conventional techniques for shadow and edge recognition, there are significant possibilities for false positives and false negatives for shadow recognition. That is, for example, a material edge that imitates a shadow and is thus identified incorrectly by a computer as a shadow or a sharp shadow boundary that is incorrectly interpreted as an object boundary.

Once shadows and object edges are identified, a typical computerized operation is manipulation of the image to, for example, remove shadows from the image. Most scenes depicted in an image have a dominant illuminant, defined as a direct or incident illuminant. The incident illuminant causes shadows. The component of radiance onto a surface in the scene that is not from the incident illuminant, is referred to as an indirect or ambient illuminant. It is the ambient illuminant that is present within a shadow. While much of the energy of the ambient illuminant may come from the incident illuminant, it has generally interacted with the environment.

Typical solutions for manipulating images focus on the incident illuminant. Models have been developed for computerized image pixel manipulation based upon the assumption that the ambient illumination has the same spectral characteristics as the incident illumination or is non-existent. One such known solution is the dichromatic reflection model, which describes the variations in appearance caused by the combination of body and surface reflection on a material. Body reflection is what is normally considered the color of the material. The surface reflection is referred to as a highlight or specularity of the material reflecting the illuminant. The known dichromatic reflection model assumes a single incident illuminant and does not account for a non-zero ambient illuminant. Thus, results of image manipulation based upon the dichromatic reflection model are often not color correct.

Other useful solutions include color spaces such as hue and chromaticity, and other normalized color spaces that attempt to factor out the effect of changing the intensity of the incident illuminant on the intensity of the reflection from a surface. However, these color models have met with limited success in solving practical vision problems. Consequently, there is a growing realization that simple models of illumination do not correctly reflect the visual world, and thus, do not provide color correct manipulations. Recent research has focused upon empirical models of color change over a single material. This approach is not restricted by any prior assumptions about the behavior of illumination color or reflectance.

There is also significant amount of research attempting to determine the complete illumination environment. These methods are based upon multiple images of the same scene and/or knowledge of the scene geometry. In one research project, the existence and importance of complex indirect illumination is acknowledged. However, the method requires both a known geometry of a scene and two images. While these research efforts approach a solution that can extract and represent illumination environments of significant complexity, they cannot be used in environments such as, for example, consumer photography, or with existing photos or in any situation where either taking multiple images of a scene from different points of view or inserting objects into a scene are not readily possible or are unreasonable.

SUMMARY OF THE INVENTION

The present invention provides a bi-illuminant dichromatic reflection model (BIDR model) as a representation of an image to facilitate color correct image manipulation.

In a first exemplary embodiment of the present invention, an automated, computerized method for manipulating an image comprises the steps of manipulating the image to provide an intensity adjusted image, deriving a bi-illuminant dichromatic reflection model representation of the image and utilizing the bi-illuminant dichromatic reflection model representation to manipulate the intensity adjusted image to generate a color correct intensity adjusted image. In a preferred embodiment of the present invention, the step of manipulating the image to provide an intensity adjusted image is carried out by executing a gamma correction method.

In a second exemplary embodiment of the present invention, a computer system comprises a CPU and a memory storing an image file. According to a feature of the present invention, the CPU is arranged and configured to execute a routine to manipulate the image to provide an intensity adjusted image, derive a bi-illuminant dichromatic reflection model representation of the image, and utilize the bi-illuminant dichromatic reflection model representation to manipulate the intensity adjusted image to generate a color correct intensity adjusted image. In a preferred embodiment of the present invention, the CPU executes a routine to manipulate the image to provide an intensity adjusted image by executing a gamma correction method.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3 is a flow chart for modifying a shadow in an image with a manual input, according to a feature of the present invention.

FIG. 4 is a graph in RGB color space showing colors for a material, from a fully shaded color value to a fully lit color value, as determined by execution of a simplified bi-illuminant dichromatic reflection model according to a feature of the present invention.

FIGS. 5a & b are graphs in RGB color space showing colors for a material, from a fully shaded color value to a fully lit color value, with error bounds forming a cylinder, as determined by execution of the bi-illuminant dichromatic reflection model according to a feature of the present invention.

FIG. 6a is a flow chart for a color correct brightness adjustment to an intensity adjusted image, according to a feature of the present invention.

FIG. 6b is a graph in RGB space showing an intensity adjusted pixel value for the intensity adjusted image of FIG. 6a.

FIG. 6c is a flow chart for estimating a gamma (γ) value for the pixel of FIG. 6b using a dynamic range compression algorithm.

FIG. 7 is a flow chart for removing direct or incident illumination from an image area, according to a feature of the present invention.

FIG. 8 is a flow chart for modifying apparent ambient illumination of an image area, according to a feature of the present invention.

FIG. 9 is a flow chart for modifying apparent direct or incident illumination of an image area, according to a feature of the present invention.

FIG. 10 is a flow chart for modifying apparent level of direct or incident illumination of an image area, according to a feature of the present invention.

FIG. 11 is a graph in RGB space showing a color correct gamma correction, according to a feature of the present invention.

FIG. 12 is a flow chart for a color correct gamma correction, as shown in FIG. 11.

DETAILED DESCRIPTION OF THE PREFERRED EMBODIMENTS

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU can be implemented as a microprocessor embedded in a device such as, for example, the digital camera 14 or a robot. The CPU can also be equipped with a real time operating system for real time operations relating to images, for example, in connection with a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electromagnetic spectrum. The present invention can also be utilized in connection with a grayscale image (a single band). The pixel array includes m columns of n rows each, starting with the pixel p(1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, manipulation of the image to modify a shadow or to make a color correct brightness adjustment. A fundamental observation underlying a basic discovery of the present invention, is that an image comprises two components, material and illumination. All changes in an image are caused by one or the other of these components.

In a first exemplary embodiment of the present invention, shadowed and fully lit regions of an image are manually selected by a user. What is visible to the human eye upon display on the monitor 20 of a stored image file 18 by the CPU 12, is the pixel color values caused by the interaction between specular and body reflection properties of material objects in, for example, a scene photographed by the digital camera 14 and illumination flux present at the time the photograph was taken. As noted above, the illumination flux comprises an ambient illuminant and an incident illuminant. The incident illuminant is light that causes a shadow and is found outside a shadow perimeter. The ambient illuminant is light present on both the bright and dark sides of a shadow, but is more perceptible within the dark region.

FIG. 3 is a flow chart for modifying a shadow in an image with a manual input, according to a feature of the present invention. In two input steps the user selects a point or region on a fully lit (Bright) material of an image 18 selected by the user (step 100) and a point or region on a fully shadowed (Dark) part of the same material in the same image 18 (step 102). These steps 100, 102 can be implemented by an interactive clicking by the user on the monitor 20 operating to display the subject image file 18. A user can select such regions because human eye physiology is capable of distinguishing between shadows and actual physical objects.

In step 104, the CPU 12 operates on the user input selections to calculate a spectral ratio, S=Dark/(Bright−Dark), where Dark, for example, is a pixel in the fully shadowed material of the region selected by the user, and Bright is a pixel in the fully lit portion of that material selected by the user. A normalized version of the spectral ratio can be used in the methods according to the present invention. According to a feature of the present invention, the spectral ratio is used to manipulate pixel values for a color correct adjustment. Based upon the fundamental observation of the present invention that an image comprises two components, material and illumination, the computer system 10 can be operated to differentiate between material aspects and illumination flux through recognition of a spectral shift caused by the interplay between the incident or direct illuminant and the ambient illuminant. When one of material and illumination is known in an image, the other can be readily deduced. The spectrum for the incident illuminant and the ambient illuminant can be different from one another. A spectral shift caused by a shadow, i.e., a decrease of the intensity of the incident illuminant, will be substantially invariant over different materials present in a scene depicted in an image.

Pursuant to a feature of the present invention, this spectral shift information is detected by determination of an illuminant ratio, or a characteristic spectral ratio formed by the interplay of the incident illuminant and the ambient illuminant. A spectral ratio is a ratio based upon a difference in color or intensities between two areas of a scene depicted in an image, which may be caused by different materials, an illumination change or both.

An automated, computerized method for determining a characteristic spectral or illuminant ratio due to illumination flux, for an image, is disclosed in co-pending application Ser. No. 11/341,742, filed on Jan. 27, 2006, entitled: "Method and System For Identifying Illumination Flux In An Image," which is hereby incorporated by reference. As disclosed in the co-pending application Ser. No. 11/341,742, to improve the accuracy and correctness of the characteristic ratio for an image, the spectral ratio information for illumination boundaries is determined on a local level, that is, an illuminant ratio is determined for each of several preselected local areas of a scene depicted in an image. An analysis of a boundary is then executed utilizing the spectral ratio for the specific location of the boundary within the image. The determination of locally relevant spectral ratios accommodates complexities that may be encountered in a real world image, for example, the interplay of several different sources of light in a room, inter-reflections, and so on.

In order to facilitate an accurate and correct manipulation of pixel values, to modify, for example, the pixel from a shaded color (Dark) to a correct fully lit color (Bright), the present invention recognizes the characteristic spectral ratio (illuminant ratio) as an analytical representation of image properties and characteristics pursuant to a bi-illuminant dichromatic reflection model. The bi-illuminant dichromatic reflection model (BIDR) combines terms relevant to the ambient illuminant with the dichromatic reflection model described above. The two illuminants of the BIDR model correspond to the incident illuminant and the ambient illuminant. The BIDR model can be stated as follow:

$$I_{(x,y,z,\theta,\phi,\lambda)} = [m_b(\theta_i)c_b(\lambda) + m_s(\theta_i,\phi_i,\theta_e,\phi_e)c_s(\lambda)]l_d(\lambda) + M_a(\lambda)c_b(\lambda) + M_{as}(\theta_e,\phi_e,\lambda)c_s(\lambda),$$

where: $I_{(x, y, z, \theta, \phi, \lambda)}$ is the radiance of a surface point at (x, y, z) in the direction $\theta$, $\phi$, for the wavelength $\lambda$, $m_b(\theta_i)$ is the spectrum independent body reflectance based on geometric factors, $c_b(\lambda)$ is the geometry independent body reflectance of a surface for the wavelength $\lambda$, $m_s(\theta_i, \phi_i, \theta_e, \phi_e)$ is the spectrum independent surface reflectance based on geometric factors, $c_s(\lambda)$ is the geometry independent surface reflectance of a surface for the wavelength $\lambda$, $l_d(\lambda)$ is the incident illuminant for the wavelength $\lambda$.

$\theta_i$ is the incident tilt angle of the illuminant onto a surface relative to the surface normal.

$\phi_i$ is the incident pan angle: the angle between the incident illuminant and a fixed axis on the tangent plane of a surface.

$\theta_e$ is the exitent tilt angle: the angle of an outgoing ray relative to the surface normal.

$\phi_e$ is the exitent pan angle: the angle between an outgoing ray and a fixed axis on the tangent plane of a surface.

All of the above terms comprise the dichromatic reflection model. The remaining terms of the BIDR model relate to the ambient illuminant, where:

$M_a(\lambda)$ is the integral of the ambient illuminant and geometric body reflectance over a hemisphere, excluding the incident illuminant, and $M_{as}(\theta_e, \phi_e, \lambda)$ is the integral of the ambient illuminant and geometric surface reflectance over the hemisphere, excluding the incident illuminant.

In the dichromatic reflection model, the radiance, $I_{(x, y, z, \theta, \phi, \lambda)}$, for a surface at a point viewed from the orientation by $\theta$, $\phi$ is expressed as the sum of two bipartite terms multiplied by the illumination intensity and color $l_d(\lambda)$ to reflect the effect of the incident illuminant. The first reflectance term explains body reflection. $m_b(\theta_i)$ is the amount of incident illuminant energy reflected by the body reflection, referred to as diffuse reflection, as a function of the geometric relationship of the light source and the surface, expressed by the incident angle $\theta_i$. $c_b(\lambda)$ is the fraction of the incident illuminant energy reflected by the body reflection for each wavelength $\lambda$ and describes what is considered the body color. The second reflection term explains surface reflection. $m_s(\theta_i, \phi_i, \theta_e, \phi_e)$ is the amount of the incident energy reflected by the surface reflection as a function of the geometry as expressed by the incident angles $\theta_i$, $\phi_i$ and exit angles $\theta_e$, $\phi_e$. $c_s(\lambda)$ is the fraction of the incident energy reflected by the surface reflection for each wavelength $\lambda$. The power of the dichromatic reflection model is that the model predicts that the appearance, or color, of a uniform color dielectric surface under a single incident illuminant falls within a plane defined by the two color vectors $c_b$ and $c_s$ in RGB space, even with variation in the amount of incident illuminant and specularities on the surface.

According to a feature of the present invention, the BIDR model adds body and surface reflection terms for the ambient illuminant, which, as noted above may have a significantly different spectrum from the incident illuminant. Unlike the incident illuminant, the ambient illuminant is radiated from the whole hemisphere visible from the surface point.

Thus, $M_a(\lambda)$ is the integral of the ambient body reflection:

$$\int m_b(\theta_i) l_a(\theta_i, \phi_i, \lambda) d\theta_i d\phi_i.$$

$M_{as}(\theta_e, \phi_e, \lambda): \int m_s(\theta_i, \phi_i, \theta_e, \phi_e) l_a(\theta_i, \phi_i, \lambda) d\theta_i d\phi_i.$ This function represents the integral of the ambient illuminant and geometric surface reflectance over the hemisphere, excluding the incident illuminant.

The above functions are an integration of all incoming illumination other than incident illuminant, as integrated over $\theta_i$, $\phi_i \neq \theta_L$, $\phi_L$ (incident illuminant). The BIDR model according to the present invention can accurately and correctly accommodate and predict tremendous complexity in the appearance of a surface, even a surface of uniform material. If, for example, the ambient environment is both bright and changes quickly across a surface, the ambient illuminant terms can cause deviations from the plane predicted by the dichromatic reflection model. Indeed, unlike the dichromatic reflection model, the BIDR model according to the present invention predicts a plane in the RGB space that does not necessarily pass through the zero point of the space, but in fact most often exhibits an offset from the zero point that comprises the color of the ambient illumination multiplied by the object color. The offset results in color correct changes when a pixel value is manipulated using the BIDR model of the present invention.

Given that the ambient illuminant is often an order of magnitude or more than the incident illuminant, the ambient specularity or body surface reflectance $M_{as}(\theta_e, \phi_e, \lambda)$ term has a minimal effect on the appearance of a surface and can be discarded without significantly affecting the quality of the model. The BIDR model then reduces to three terms:

$$I_{(x,y,z,\theta,\phi,\lambda)} = [m_b(\theta_i)c_b(\lambda) + m_s(\theta_i, \phi_i, \theta_e, \phi_e)c_s(\lambda)]l_d(\lambda) + M_a(\lambda)c_b(\lambda).$$

Inasmuch as the appearance of cast shadows on a surface is also relevant to the uses of the BIDR model, a shadow term or factor $s_{x, y, z} \in [0,1]$ can be added to multiply the incident illuminant term:

$$I_{(x,y,z,\theta,\phi,\lambda)} = [m_b(\theta_i)c_b(\lambda) + m_s(\theta_i, \phi_i, \theta_e, \phi_e)c_s(\lambda)]l_d(\lambda)s_{x,y,z} + M_a(\lambda)c_b(\lambda).$$

A fully lit pixel will have a shadow factor, s=1, and a fully shadowed pixel will have an s=0, with the only remaining term in the model at s=0 being the ambient body reflection. The model can be restated by substituting $\gamma_b$, the product of the shadow factor $s_{x, y, z}$ and the geometric factor $m_b(\theta_i)$, for those non-spectral factors in the body reflection, and $\gamma_s$, the product of the shadow factor $s_{x, y, z}$ and the geometric factor $m_s(\theta_i, \phi_i, \theta_e, \phi_e)$, for those non-spectral factors in the surface reflection. The BIDR model is thus restated as: $I_{(x, y, z, \theta, \phi, \lambda)} = c_b(\lambda)l_d(\lambda)\gamma_b + c_s(\lambda)l_d(\lambda)\gamma_s + M_a(\lambda)c_b(\lambda).$ In the absence of specularities in a material, the second term of the BIDR model, $c_s(\lambda)l_d(\lambda)\gamma_s$, is zero, and the measured values of a surface will exist on a single theoretical line in, for example, RGB space. With no specularity term, the BIDR model is given by: $I_{(x, y, z, \theta, \phi, \lambda)} = c_b(\lambda)l_d(\lambda)\gamma_b + M_a(\lambda)c_b(\lambda)$. FIG. 4 shows a graph in RGB color space for colors for a material, from a fully shaded color value to a fully lit color value, as determined by execution of a simplified bi-illuminant dichromatic reflection model from $\gamma_b=0$ to $\gamma_b=1$, according to a feature of the present invention. As shown in FIG. 4, the model predicts that all of the measured colors of a particular material in shadow, light and penumbra extend along a line in RGB space (the cube shown in FIG. 4). An adjustment to a pixel value along a line predicted according to the BIDR model yields a color correct result. For a further discussion regarding the generation of BIDR cylinder representations of an image, reference should be made to co-pending application Ser. No. 11/341,753, filed Jan. 27, 2006, entitled "Method And System For Identifying Illumination Fields In an Image," which is hereby incorporated by reference.

In practice, a camera or other sensor used to record an image typically has noise, and no material in an image is of a completely uniform color. Accordingly, the appearance values of the surface fall within a cylinder having a width determined by variation in material and imaging sensor noise characteristics. The cylinder representing body reflection, according to the incident and ambient illuminants considered in the BIDR model of the present invention, has a unique starting place for every intrinsic color in the scene. The starting point is determined by the product of the ambient illumination and the body color, and the slope of the cylinder in RGB space is determined by the product of the incident illumination and the body color.

FIGS. 5a & b are graphs in RGB color space showing colors for a material, from a fully shaded color value to a fully lit color value, with error bounds forming a cylinder. In FIG. 5a, a cylinder is shown around the RGB line predicted by the BIDR model (a BIDR cylinder), with the dimensions of the cylinder diameter being a function of the noise of the recording device used to record the image, and variations.

FIG. 5b, illustrates a cone shaped BIDR cylinder in recognition that the same absolute distance at the fully shadowed end represents a greater actual color difference than the same absolute distance from the line at the fully lit end of the line. This is due to the fact that the magnitude of the color band intensities at the shadow end are a greater percentage of the actual distance from the line in the shadow end than at the lit end. For example, consider a color at the shadow end of the cylinder of (RGB)=(5, 6, 8) and a color at the lit end of (100, 120, 160). If the CPU 12 modifies the color value for each 10 units toward the color red from both color values, the result is a shadow color value of (15, 6, 8) and a lit color of (110, 120, 160). At the dark end, the color shifted from a distinctly blue color to a distinctly red color, while at the lit end the color remains blue. In order to compensate for the difference, an adjustment is made to the cylinder to be narrower at the shadow end and wider at the lit end such that a same magnitude of color change will have a correspondingly accurate absolute distance from the line.

When stating the spectral ratio, S=Dark/(Bright-Dark), in terms of the BIDR model, $S = M_a(\lambda)c_b(\lambda)/([c_b(\lambda)l_d(\lambda)\gamma_b + M_a(\lambda)c_b(\lambda)] - M_a(\lambda)c_b(\lambda))$. This equation reduces to $S = M_a(\lambda)/l_d(\lambda)\gamma_b$. Inasmuch as $\gamma_b$ is scalar, the relative proportions of different color bands in the spectral ratio, for example, RGB values, are constant. Thus, for a given pair of direct and ambient illuminants in an image, the normalized spectral ratio is constant for all Bright and Dark pairs that correspond to the same material when Dark is assumed to have a $\gamma_b=0$, and the Bright is receiving some incident illuminant. The spectral ratio is therefore a representation of image properties and characteristics that, according to the BIDR model, can be utilized as a basis for manipulation of pixel values for a color correct adjustment, for example, as a prediction of color adjustments that fall within a color correct cylinder in RGB space, as illustrated in FIG. 5b.

In addition, the BIDR model can be used as a basis for representing pixel values. Rather than an RGB value, each pixel is represented by a BIDR cylinder in RGB space and a $\gamma$ value, to indicate where in a specific BIDR cylinder, for example, the cylinder of FIG. 5b, the color of a specific pixel is located. Moreover, a spectral ratio based upon the Dark and Bright pixels of a specific BIDR cylinder can be calculated as a local characteristic or illuminant ratio for the image, as discussed above. The BIDR cylinder/$\gamma$/spectral ratio representation for a pixel provides a comprehensive and unique form of pixel representation that permits color correct manipulations of the pixel.

In step 106, the user selects an area from within the regions provided by the user in steps 100, 102, to be manipulated or corrected, and the degree of adjustment. The degree of adjustment is reflected in the value of $\gamma_b$, with, for example, $\gamma_b=0.5$ being selected if the user desired a half-shadow. In step 108, the CPU 12 uses the spectral ratio calculated in step 104 to adjust the intensity and color of the selected region to achieve the degree of adjustment selected by the user.

FIG. 10 is a flow chart for modifying apparent level of direct or incident illumination of an image area, according to a feature of the present invention. The flow chart of FIG. 10 can be utilized to carry out step 108 of FIG. 3. In the routine of FIG. 10, the CPU 12 is given, in addition to the spectral ratio calculated by the CPU 12 from Dark, for example, a pixel in the fully shadowed material of the region selected by the user, and Bright, a pixel in the fully lit portion of that material selected by the user (step 104), the set of pixels comprising the area selected by the user (step 106), a gamma ($\gamma$) map for the set of pixels, and a new gamma map set at a level corresponding to the degree of adjustment selected by the user, for example, a $\gamma_b=0.5$ if the user desired a half-shadow (step 114).

A method for generating an approximate gamma map for the pixels of the image can comprise a dynamic range compression algorithm as an input. Examples of such algorithms include a Retinex based algorithm, marketed by Hewlett-Packard or a gamma correction algorithm, an industry standard image compression algorithm. Note that a gamma correction process is distinct from a gamma map that indicates a gamma (γ corresponding to $\gamma_b$ of the BIDR model representation). For a further discussion of gamma map generation, see the description of FIGS. 6b and 6c, below.

In step 116, the CPU 12 operates to calculate a fully shadowed (Dark) version of each pixel in the selected area, Dark=P/(1+γ/S), where P is the color vector in RGB space of a pixel in the selected area of the subject image 18, gamma (γ) is the value of gamma for that pixel from the gamma map, and S is the spectral ratio calculated by the CPU 12 in step 104 of FIG. 3. The use of the spectral ratio as a representation of the BIDR model for the subject image 18 results in a color correct Dark determination corresponding to the end point of the cylinder predicted by the BIDR model for the pixel, as depicted in FIG. 5b. Thus, the Dark value correctly corresponds to the $M_a(\lambda)c_b(\lambda)$ term for that pixel in the selected area of the subject image 18.

In step 118, the CPU 12 calculates a color adjusted new value for each pixel in the selected area as a function of the new gamma map designated by the user: $P_{new}$=Dark+$\gamma_{new}$ (Dark/S), where $\gamma_{new}$ is the new value for the pixel from the new gamma map designated by the user. In step 120, the CPU 12 outputs the image area with the modified incident illuminant (step 108 of FIG. 3).

Referring once again to FIG. 3, the CPU 12 can smooth, feather or implement other known techniques to the modified image (step 110) and then output the modified image, for example for display on the monitor 20 or print out on the printer 22 (step 112).

FIG. 6a shows a flow chart for a color correct brightness adjustment to an intensity adjusted image, according to a feature of the present invention. The CPU 12 is given an original image area, an intensity adjusted image area, a gamma map and a spectral ratio S for the original image area (step 200). The intensity adjusted image area can be the output of a known dynamic range compression algorithm, such as, for example, the Retinex-based dynamic range compression algorithm marketed by Hewlett-Packard or a Foveon statistics-based dynamic range compression algorithm. These algorithms brighten darker areas of an image for a more pleasing appearance, by adjusting the intensity but not the color of pixels: f*(R, G, B)=>(fR, fG, fB). The routine of FIG. 6a is meant to shift the colors as well as the intensity for each pixel for a color correct image adjustment. The gamma (γ) map can be estimated by ascertaining a difference between the intensity adjusted image and the original image.

To that end, reference is made to FIGS. 6b and 6c. FIG. 6b is a graph in RGB space showing an intensity adjusted pixel value for the intensity adjusted image input to the CPU 12 in the routine of FIG. 6a. The graph shows the RGB value of the original pixel P and the intensity adjusted value for the pixel A. The graph also shows the position of a fully shadowed version of the pixel Dark, and a color correct fully lit version B, as predicted by the BIDR model according to a feature of the present invention. As can be clearly seen in the graph of FIG. 6b, the color of A is displaced in RGB space from the color correct value for the intensity adjusted pixel, B. The result of execution of the routine of FIG. 6a by the CPU 12 is an adjustment of A to the value of B, for a color correct depiction of the scene in the image.

FIG. 6c is a flow chart for estimating a gamma (γ) value for the pixel of FIG. 6b using a dynamic range compression algorithm. In step 400, the CPU 12 is provided with the input information corresponding to the input to the CPU 12 in step 200 of FIG. 6a, absent the gamma value to be determined by the routine of FIG. 6c. In step 402, for each pixel in the image 18, the CPU 12 calculates a ratio of the scalar value of the intensity adjusted pixel of the image divided by the scalar value of the original pixel value P: R=||A||/||P||.

In step 404, for each pixel, the CPU 12 determines a Q, as the value of the minimum of R or the value of (1+||S||)/||S||. In step 406, for each pixel, the CPU 12 calculates a gamma value: γ=[(1+||S||)/Q]−||S||. After completing steps 402-406 for each pixel, the CPU outputs a gamma map of the image, with a gamma value for each pixel. The gamma value indicates the percent of incident or direct illuminant on the pixel.

In step 202, the CPU 12 calculates a fully shadowed version (Dark) for each pixel as performed by the CPU 12 in step 116 of FIG. 10, utilizing the algorithm Dark=P/(1+γ/S) wherein γ is the estimated value in the map generated from execution of the routine of FIG. 6c. In step 204, the CPU 12 uses the Dark version of each pixel, the spectral ratio and the estimated γ to calculate the color and intensity of each pixel such that the corrected pixel has an intensity that matches the intensity adjusted image with a correct color. Initially the CPU 12 calculates a bright version of each pixel: $P_{bright}$=$P_{original}$*(1+S)/(γ+S). $P_{bright}$ is the color correct version of $P_{original}$. Next, the CPU 12 determines an RGB vector relative to intensity change for each pixel: V=$P_{bright}$−Dark.

Thereafter, the CPU 12 calculates a fraction representing the difference between the goal intensity, that is, the intensity of the intensity adjusted image, and the intensity of the $P_{bright}$: fraction=($P_{goal\ intensity}$−$P_{bright\ intensity}$)/$V_{intensity}$. The adjustment required to the intensity of $P_{bright}$ to reach the intensity of the intensity adjusted image is Adjustment=fraction*V. The final pixel value is then: $P_{final}$=$P_{bright}$+Adjustment.

After the CPU 12 completes step 204 for each pixel in the image area, the CPU 12 outputs a color correct intensity adjusted image (step 206).

FIG. 7 is a flow chart for removing direct or incident illumination from an image area, according to a feature of the present invention. In step 208, the CPU 12 is given an original image area, which can be, for example, an area of an image file 18 selected by a user, a gamma map for the image area, and a characteristic spectral ratio S for the image area.

In step 210, the CPU calculates a shadowed version (Dark) of each pixel in the image area, again as performed by the CPU 12 in step 116 of FIG. 10, utilizing the algorithm Dark=P/(1+γ/S). Upon completion of step 210 for all pixels, the CPU 12 outputs an image with all materials lit only by the ambient illuminant (step 212).

FIG. 8 shows a flow chart for modifying apparent ambient illumination of an image area, according to a feature of the present invention. In step 214, the CPU 12 is given an original image area, a gamma map, a characteristic spectral ratio S for the image area, and an ambient illuminant modifier vector V. The ambient illuminant modifier vector is a vector in, for example, RGB space that, when multiplied by the actual vector of a fully shadowed pixel in the image (Dark), provides a modified version of the pixel with a new apparent ambient illumination.

In step 216, the CPU 12 uses the spectral ratio and gamma map to calculate a fully shadowed (Dark) version of each pixel in the image area, again using the algorithm: Dark=P/(1+γ/S). In steps 218, 220, the CPU 12 multiplies each Dark pixel by V to yield Dark$_{new}$ and thereby obtain a new apparent ambient illuminant (step 218), and also multiply S by V to obtain S$_{new}$ (step 220).

In step 222, The CPU 12, using S$_{new}$ and the gamma map, calculates a new color for each pixel: P$_{new}$=Dark$_{new}$+γ (Dark$_{new}$/S$_{new}$). Upon completion of step 222 for all pixels, the CPU 12 outputs an image area with a modified apparent ambient illuminant (step 224).

FIG. 9 is a flow chart for modifying apparent direct or incident illumination of an image area, according to a feature of the present invention. In step 300, the CPU is given an original image area, a gamma map and spectral ratio for the image area and an incident or direct illuminant modifier vector V. The direct illuminant modifier vector is a vector in, for example, RGB space that can be used to modify the spectral ratio for use in modifying the apparent direct illumination in the image area.

In step 302, the CPU 12 calculates a Dark version of each pixel, as completed in the routines of the previous figures. In step 304, a new spectral ratio is determined by the CPU 12 using the vector V, S$_{new}$=S*1/V. The new spectral ratio permits a manipulation of pixel values to in effect, modify the apparent incident illumination. In step 306, the CPU 12 uses S$_{new}$ and the gamma map to calculate a new color for each pixel: P$_{new}$=Dark+γ(Dark/S$_{new}$). Upon completion of step 306 for all pixels, the CPU 12 outputs an image area with a modified apparent direct or incident illuminant.

FIG. 11 is a graph in RGB space showing a color correct gamma correction, according to a feature of the present invention. The graph shows the RGB value of the original pixel C and the intensity adjusted value for the pixel B$_1$ after gamma correction. The graph also shows the position of a fully shadowed version of the pixel, Dark, and a color correct fully lit version P, as contained within a BIDR cylinder, as predicted by the BIDR model according to a feature of the present invention. As can be clearly seen in the graph of FIG. 11, the color of B$_1$ is displaced in RGB space from the color correct value for the pixel P. The pixel B$_2$ is the color correct intensity adjusted value for the pixel P (and thus of the original pixel C) after gamma correction, according to the present invention.

Gamma correction is an industry standard method for brightening an image for display on a monitor or in print. According to the standard, an image is adjusted such that for each pixel in the image, the intensity is measured on a scale of 0 to 1, and the brightened intensity is equal to the original intensity raised to a power of (1.0/gamma), where gamma is a value greater than or equal to 1.0. The gamma used in the industry standard is not to be confused with gamma used above in this document to represent the fraction of incident light on a surface. To avoid confusion, the brightening factor used herein can be defined as lambda (λ). Gamma correction brightens all pixels some amount irrespective of illumination. Like other forms of dynamic range compression, gamma correction brightens shadows without making them more similar in color to the color correct unshaded counterparts. As will be described, the concepts of the BIDR model of the present invention can be applied to brighten shadows and adjust the color to provide a color correct, and thus, more visually pleasing image.

FIG. 12 is a flow chart for a color correct gamma correction, as shown in FIG. 11. In step 600, the CPU 12 is provided an original image, from an image file 18, a brightening power, λ, and a normalized spectral ratio for the image, S. In step 602, for each pixel C, the CPU 12 finds the brightened intensity(B$_1$) as intensity(C)$^{1.0/lambda}$, as in a standard and normal gamma correction. Then, in step 604, the CPU 12 calculates two ratios. R$_1$ is some small percentile (such as the 5th, 10th, 20th, or 40th) value of intensity(B$_1$)/intensity(C). R$_2$ is some large percentile (such as 60th, 80th, or 95th) value of intensity(B$_1$)/intensity(C). R1 represents a minimum degree of brightening, and pixels with a smaller ratio are assumed to be fully lit; R2 represents a maximum degree of brightening, and pixels with a larger ratio are assumed to be fully shadowed.

In step 606, the CPU 12 calculates the intensity of the DARK pixel (intensity(D)) of the BIDR cylinder as intensity (D)=intensity(B$_1$)/R$_2$. If intensity(D)>intensity(C), then the value C is updated to be C*intensity(D)/intensity(C). Next, in step 608, the CPU 12 calculates the intensity of the bright pixel P on the BIDR cylinder C as intensity(C)/R$_1$ if intensity (B$_1$)/intensity(C)>R$_1$; otherwise, the intensity(P) is set to intensity(C). The intensity(P) will be less than the intensity (B$_1$) because gamma correction brightens all pixels, even pixels in full incident illumination. The ratio R$_1$ is a measurement of the excess brightening beyond full incident illumination.

Knowing the normalized spectral ratio Ŝ, the original color C, and the intensity(D), the CPU 12 calculates the dark color D in step 610. The dark color D is the color such that D=(kŜC)/(1+kŜ) for some scalar k. There is one value of k that satisfies the equation with the correct intensity for D. The value can be found by a direct algebraic solution or by successive approximation.

With the dark color D, the intensity(P), and the normalized spectral ratio Ŝ, the CPU 12 calculates the fully lit color P in step 612. The color P is the color with the proper intensity such that P=(D+DŜk)/(Ŝk) for some scalar k. The scalar k can be found as k=(D$_R$/Ŝ$_R$+D$_G$/Ŝ$_G$+D$_B$/Ŝ$_B$)/(3*intensity(P)−D$_R$−D$_G$−D$_B$). In step 614, the CPU 12 brightens the color P to have the same intensity as B$_1$, resulting in the color corrected brightened color B$_2$. Following these steps for each pixel in the image produces a gamma corrected image with appropriately colored shadows (step 616).

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for manipulating an image, comprising the steps of:
   a computer executing the following steps:
   providing an image file depicting an image;
   manipulating the image of the image file to provide an intensity adjusted image;
   deriving a bi-illuminant dichromatic reflection model representation of correct color of material depicted in the image, to represent correct color values for the image, across multiple materials of the image, within a range extending from fully shaded color value to fully lit color value, the bi-illuminant dichromatic reflection model representation of correct color being expressed by a characteristic spectral ratio consistent across multiple materials of the image wherein the characteristic spectral ratio is calculated as a ratio between a bright color and a dark color, each of the bright color and the dark color being a multi-band representation of a single material in the image, to provide an indication of correct color change, from fully shaded color value to fully lit color value, across multiple materials of the image; and
   utilizing the bi-illuminant dichromatic reflection model representation to manipulate the intensity adjusted image of the image file to generate a color correct intensity adjusted image having correct color of material depicted in the image, the correct color being set at any selected degree of adjustment within the range extending from fully shaded color value to fully lit color value and determined as a function of the correct color values represented by the characteristic spectral ratio expression of the bi-illuminant dichromatic reflection model for the range extending from fully shaded color value to fully lit color value and when an intensity adjustment for the intensity adjusted image causes an intensity beyond the range of a fully lit color value, adjusting intensity with reference to a fully lit color value determined according to the characteristic spectral ratio expression of the bi-illuminant dichromatic reflection model.

2. The method of claim 1 wherein the step of manipulating the image to provide an intensity adjusted image is carried out by executing a gamma correction method.

3. The method of claim 2 wherein the image comprises pixels having an original intensity adjusted by the gamma correction method.

4. The method of claim 3 wherein the step of utilizing the bi-illuminant dichromatic reflection model representation to manipulate the intensity adjusted image to generate a color correct intensity adjusted image includes the step of calculating color correct intensities for each pixel, as a function of ratios, R1 representing a minimum degree of brightening, R2 representing a maximum degree of brightening.

5. The method of claim 1 wherein the step of utilizing the bi-illuminant dichromatic reflection model representation to manipulate the intensity adjusted image to generate a color correct intensity adjusted image is carried out by utilizing the spectral ratio to calculate color correct color values for fully lit and dark versions of pixels of the image.

6. A computer system which comprises:
 a CPU; and
 a memory storing an image file depicting an image;
 the CPU arranged and configured to execute a routine to manipulate the image to provide an intensity adjusted image, derive a bi-illuminant dichromatic reflection model representation of correct color of material depicted in the image, to represent correct color values for the image, across multiple materials of the image, within a range extending from fully shaded color value to fully lit color value, the bi-illuminant dichromatic reflection model representation of correct color being expressed by a characteristic spectral ratio consistent across multiple materials of the image wherein the characteristic spectral ratio is calculated as a ratio between a bright color and a dark color, each of the bright color and the dark color being a multi-band representation of a single material in the image, to provide an indication of correct color change, from fully shaded color value to fully lit color value, across multiple materials of the image, and utilize the bi-illuminant dichromatic reflection model representation to manipulate the intensity adjusted image to generate a color correct intensity adjusted image having correct color of material depicted in the image, the correct color being set at any selected degree of adjustment within the range extending from fully shaded color value to fully lit color value and determined as a function of the correct color values represented by the characteristic spectral ratio expression of the bi-illuminant dichromatic reflection model for the range extending from fully shaded color value to fully lit color value and when an intensity adjustment for the intensity adjusted image causes an intensity beyond the range of a fully lit color value, to adjust intensity with reference to a fully lit color value determined according to the characteristic spectral ratio expression of the bi-illuminant dichromatic reflection model.

7. The computer system of claim 6 wherein the CPU executes a routine to manipulate the image to provide an intensity adjusted image by executing a gamma correction method.

* * * * *